United States Patent [19]

Oien

[11] Patent Number: 5,525,663
[45] Date of Patent: Jun. 11, 1996

[54] REACTIVE HOT-MELT ADHESIVE AND/OR SEALING COMPOSITION AND METHOD OF USING SAME

[75] Inventor: Hans T. Oien, North Oaks, Minn.

[73] Assignee: Minnesota Mining and Manufacturing Company, St. Paul, Minn.

[21] Appl. No.: 292,468

[22] Filed: Aug. 18, 1994

[51] Int. Cl.$^6$ ............................ C08J 9/32; C08K 3/34; C08L 75/00
[52] U.S. Cl. .................. 524/590; 523/218; 523/219; 524/442; 524/492; 524/493; 524/494
[58] Field of Search .................. 524/590, 492, 524/493, 494, 442; 523/218, 219

[56] References Cited

U.S. PATENT DOCUMENTS

| | | | |
|---|---|---|---|
| 4,005,033 | 1/1977 | Georgeau et al. | 260/2.5 |
| 4,217,376 | 8/1980 | Donermeyer et al. | 427/142 |
| 4,219,459 | 8/1980 | Donermeyer et al. | 260/40 |
| 4,223,067 | 9/1980 | Levens | 428/308 |
| 4,252,712 | 2/1981 | Donermeyer et al. | 260/40 |
| 4,388,424 | 1/1983 | Kennell et al. | 523/219 |
| 4,618,525 | 10/1986 | Chamberlain et al. | 428/209 |
| 4,745,139 | 5/1988 | Haasl et al. | 523/149 |
| 4,868,012 | 9/1989 | Demoulin | 427/208 |
| 5,034,453 | 7/1991 | Takada et al. | 524/590 |
| 5,137,984 | 8/1992 | Kangas et al. | 525/411 |
| 5,258,578 | 11/1993 | Smith et al. | 174/93 |

FOREIGN PATENT DOCUMENTS

| | | |
|---|---|---|
| 0455400A2 | 6/1991 | European Pat. Off. |
| WO91/15530 | 10/1991 | WIPO. |
| WO92/09503 | 6/1992 | WIPO. |
| WO92/13017 | 8/1992 | WIPO. |

OTHER PUBLICATIONS

Polymeric Materials and Processing published by Hanser Publishers, New York, NY 1990, pp. 36–68.

*Primary Examiner*—Paul R. Michl
*Assistant Examiner*—Patrick Niland
*Attorney, Agent, or Firm*—Gary L. Griswold; Walter N. Kirn

[57] ABSTRACT

A reactive hot melt adhesive and/or sealing composition having a heat of crystallization in joules/gram of −2 or lower, comprising a curable heat-flowable adhesive material and a particulate filler, wherein said composition has a thermal conductivity of less than 0.30 W/m.°C. The invention also relates to a method of using the adhesive/sealer composition described herein to fill a cavity or recess in a substrate and the filled substrates formed thereby.

23 Claims, No Drawings

REACTIVE HOT-MELT ADHESIVE AND/OR SEALING COMPOSITION AND METHOD OF USING SAME

BACKGROUND OF THE INVENTION

1. Field of the Invention

This invention generally relates to reactive hot-melt adhesive and/or sealing compositions containing a particulate filler providing improved toolability, wettability and cure profile times, among other things. The invention also relates to a method of using such a sealing composition to fill a cavity or recess in a substrate or between substrates, and the filled articles formed thereby.

2. Description of the Related Art

Adhesive sealants, caulks, and the like, are generally known which incorporate fillers in order to adjust certain physical characteristics of the material such as viscosity and other rheological features such as slumping, weight, toughness, flexibility, resilience, and so forth. Fillers and reinforcing agents generally are selected to have such chemical and temperature resistance so that they might be unaffected by processing with either reactive or thermoplastic systems.

However, in general, prior adhesive sealants are not thought to be entirely satisfactory. For instance, prior adhesive sealants do not have the capability of being shaped or tooled into intricate shapes and/or, if curable, the sealant material cures too slowly. Examples of such needed intricate shapes are seams observed where doorskins are attached to door frames on some new automobiles or the body side seam on some new models of leisure vans. Further, a fast curing adhesive sealant would be highly desirable, such as in the automotive aftermarket, so that as it can be handled more immediately after application without being too tacky, or leaving fingermarks, and so that it can be overpainted without delay.

Regarding previously proposed sealant formulations in more detail, U.S. Pat. Nos. 4,214,019 and 4,252,712 to Donnermeyer et al. describe a block copolymer hot melt adhesive composition and a method for filling a cavity in a substrate with the adhesive. The adhesive composition contains a block copolymer, aluminum powder, glass fiber and hollow inorganic silicate microspheres. The microspheres are said to be required in a minor amount sufficient cause further increase in the melt viscosity with the amount limited so that flow and workability are not impaired. To meet these objectives, an amount microspheres of generally up to about 10 volume percent of the total composition is stated as being required.

As a slight variant to the above, U.S. Pat. Nos. 4,214,019 and 4,217,376 to Donnermeyer et al. describe a block copolymer hot melt adhesive composition and a method for filling a cavity in a substrate with the adhesive, wherein the adhesive composition contains a block copolymer, particulate inorganic reinforcing agent, glass fiber and hollow inorganic silicate microspheres. Again, an amount microspheres of generally up to about 10 volume percent of the total composition is stated as being required. Also, the Donnermeyer et al. patents all relate to nonreactive adhesive systems.

U.S. Pat. No. 4,388,424 to Kennell et al. describe an ambient or room temperature caulk or sealant composition that is extrudible or trowellable. The caulk or sealant composition contains an acrylic copolymer latex binder, glass microballoons, plasticizer, solvent, water adhesion promoters, mineral filler and/or coloring pigments, and the like. The microballons are said to increase the thermal insulation properties and decrease the shrinkage properties in the dried caulk seam as well as impart good extruding characteristic during application and curing of the caulk at ambient temperatures.

As known, setting or hardening of adhesives, including adhesive sealants, into a solid form occurs in three different basic ways: by cooling, by solvent removal, or by a chemical reaction. Of the three, it is generally understood that solvent-based adhesives, such as described by Kennell et al., typically suffer the greatest shrinkage during solidification (solvent removal). Such shrinkage can greatly undermine the performance of an adhesive sealant since the sealant needs to make and maintain intimate contact with the surfaces of the cavity or recess being filled. Kennell et al. does not relate to adhesive sealants which set by cooling and/or chemical reaction. Also, unlike hot melts, solvent-based sealant systems cannot be formulated as 100% solids, and thus have associated higher costs and ecological drawbacks.

U.S. Pat. No. 4,005,033 to Geogeau et al. discloses a solvent-based pasty mastic adhesive or sealant containing organic hollow microspheres, preferably heat expandable thermoplastic spheres. Thermoplastic microspheres generally soften at too low a temperature to be applicable for hot melt applications. The use of thermosetting plastic microspheres in hot melts would be contraindicated due to the risk of the spheres reactivity in the system.

PCT Application WO 92/09503 to Garvey et al., published Jun. 11, 1992, describes a microwave package containing a quantity of hot melt adhesive, where the hot melt adhesive may be of a type which is activatable without microwave susceptors, i.e., of a water retaining type, or may be of a type including microwave susceptors. The microwave susceptor particles include nonsusceptor particles, such as microbubbles or flakes, which are coated with a microwave susceptor layer including a metal or metal -oxide, -silicide, -boride and -phosphide. A hot melt adhesive is exemplified which is loaded with glass microbubbles coated with tungsten.

European Patent Applicant No. 0 455 400, published 6 Nov. 1991 (Stolobic et al.), and PCT Application WO 92/13017 (Kangas), each disclose an adhesive coating or sealant formulation formed of a blend of isocyanate-terminated polyurethane prepolymers. In the case of Kangas et al, this blend consists essentially of a first isocyanate-terminated polyurethane based on the reaction product of a polyhexamethylene adipate and a polyisocyanate and a second isocyanate-terminated polyurethane based on the reaction product of poly(tetramethylene ether) glycol and a polyisocyanate. Kangas disclose a similar adhesive coating but also requiring a third prepolymer comprising the reaction product of an essentially amorphous hydroxy-functional material and polyisocyanate. Stolobic et al. and Kangas each disclose the optional use of other adjuvants in amounts up to 50% weight of the composition either individually or alone. Examples of such adjuvants are listed as being chain extension agents, fillers, metal oxides, minerals, thermoplastic resins, plasticizers, antioxidants, pigments, U.V. absorbers, and adhesion promoters. As examples of fillers, Stolobic et al. and Kangas each similarly list carbon black and glass, ceramic, metal or plastic bubbles; although no bubbles of any kind are demonstrated in the examples of either reference.

Also, conventional plastic (PVC) plumbing drain pipe and joint fixtures, e.g., ells, tees, and the like, are usually joined and sealed using solvent-based adhesives. The solvent-based adhesives set very rapidly and allow only a short period of time to accurately align of the fixtures before the adhesive sets. Also, the solvent-based adhesives have low viscosity and body which can make it difficult to fully seal the joint.

Also, in the conventional construction industry, there is a need for an adhesive and/or sealant which is flexible yet strong upon cure and has a relatively long open time to permit facile tooling in cracks between adjoining concrete slabs, boards, sheet rock, plywood and the like.

It is not thought that the field heretofore has disclosed the use, nor appreciated the advantages, that can be gained by filling hot melt adhesives and reactive or curing hot melt adhesive systems with hollow objects made of inorganic silicate having a certain thermal conductivity.

SUMMARY OF THE INVENTION

The present invention relates to reactive hot-melt adhesive compositions having a heat of crystallization ($\Delta H$) in joules/gram of $-2$ or lower, where particulate fillers of a certain type and amount are added effective to provide an overall thermal conductivity in the composition of less than 0.30 Watts per meter per degree Centigrade (Watts/m.°C.).

For purposes of this application, the terms below have the following meanings:

"hot melt adhesive" means a polymeric composition which is a solid at room or ambient temperature (20° to 30° C.), which melts to a viscous yet flowable liquid state when heated, and, upon cooling, sets into a firm solid state;

"reactive", as used to further characterize a hot melt adhesive, means a hot melt adhesive material containing at least two different co-reactive monomers, oligomers or prepolymers capable of being polymerized after application to a substrate to form a three-dimensional polymeric network;

"curable" has the same meaning as "reactive";

"prepolymer" means a polymer having a number average molecular weight less than the entaglement molecular weight;

"particulate" means a flowable material is characterized as formed of separate fine solid particles, inclusive of hollow solid particles;

"filler" means a particulate material generally possessing such temperature resistance that it is unaffected by processing with reactive polymeric systems;

"cellular" means an object having a solid wall or walls enclosing partially or completely at least one cavity or space;

"wetting" means the process in which a liquid spontaneously adheres to and spreads on a solid surface;

"toolable" means the capability of an applied bead of adhesive or sealant to be shaped out of its original form with pressure exerted by a trowel or like device without substantial removal, transfer or loss of adhesive material from the bead;

"open time" means the time after the adhesive or sealant bead is applied, till it is no longer toolable.

"thermal conductivity" or "$\lambda$" means the heat passing, in unit time, through unit cross-sectional area of a substance when there is unit temperature gradient between the opposite faces. $\lambda$ is measured according to industrial standard ASTM C 518; and "heat of crystallization" or "$\Delta H$" means the quantity of heat liberated (negative values) or adsorbed (positive values) upon crystallization in joules/gram of the composition. $\Delta H$ is measured according to industrial standard ASTM E 793 using a Perkin-Elmer #7 series Thermal Analysis System.

The reaction adhesive/sealant composition of the present invention provided with an overall thermal conductivity in the composition of less than 0.30 Watts/m.°C. by virtue of the added filler shows many advantages, including improved wettability, adherability, flexability and toolability over adhesives filled with conventional fillers, such as calcium carbonate.

For instance, the adhesive/sealant composition of the invention has an unexpectedly superior open time behavior for tooling of the bead, as it can be successfully tooled even after a delay of 30 minutes without losing adhesion.

Also, the use of types of fillers, for example, hollow inorganic silicate (glass) objects, in amounts providing an overall thermal conductivity in the adhesive/sealant composition of less than 0.30 W/m.°C., provides unexpectedly improved heat transfer control to provide reduced back melting with "melt-on-demand" capability, i.e., the adhesive/sealant melts more quickly with less back-melting, and less sag due to lower density. These advantages are realized such as where the adhesive/sealant of the present invention is loaded in stick form or cartridge form in a dispenser gun and applied in a melted state to a substrate. The adhesive has improved wettability and, thus, it can be more facilely spread and tooled out into the desired configuration over a substrate. These advantages, are attributable, at least in part, to the inventive use of fillers as an additive to the adhesive providing the thermal conductivity value of less than 0.3 W/m.°C., and more preferably less than 0.2 W/m.°C. These fillers impart unexpectedly advantageous thermal properties as compared to metal spheres, metal-coated glass bubbles, and the like without impairing the adherability (tack) of the adhesive. Also, the glass bubbles do not separate out of the adhesive system and reduce by about a half the cost of the adhesive. Further, as the adhesive/sealant of the present invention can be used as 100% solids, and thus avoids problems associated with the use of solvent.

It is thought that upon application and cooling of the adhesive/sealant composition of the present invention from a molten state that the heat of crystallization, also known as the enthalpy of fusion, of the semi-crystalline adhesive component provides a source of heat, which in combination with low thermal conductivity of the particulate filler, extends the open time of the adhesive facilitating polymer orientation processes taking place at the substrate surface which increase the strength of the adhesive bond. However, the presence of filler such as glass bubbles in this adhesive system imparts surprising improvements thereto. While not desiring to be bound by any theory at this time, the particulate filler is thought to behave like a slow drying solvent in extending the mobility of the polymer chains as they slowly come together and interact as the solvent evaporates from the coating. Examples of such polymer orientation and wetting processes include, but are not limited to, the displacement of air from, and filling of the micro-contours of the substrate surface by, liquid adhesive, and the orientation of adhesive molecules near the surfaces of both the substrate and reinforcing filler particles. The particulate, reinforcing filler reduces adhesive density, thermal conductivity, and cost while increasing adhesive strength.

In one further embodiment, the adhesive/sealant composition of this invention, as filled by the aforesaid filler providing an overall thermal conductivity in the adhesive/sealant composition of less than 0.30 W/m.°C. involves a blend of isocyanate-terminated polyurethane prepolymers having an overall crystallization temperature of from about 25° C. to about 70° C. and a heat of crystallization in joules/gram of −2 or lower. In this embodiment, the adhesive blend comprises (a) a first prepolymer which is the reaction product of an at least essentially semicrystalline hydroxy-functional material and a polyisocyanate and (b) a second prepolymer which is a reaction product of an at least essentially amorphous hydroxy-functional material and a polyisocyanate. The semicrystalline material, in addition to serving as a heat source, adds strength to the adhesive by virtue of crystalline bonds between and within the polymer molecules comprising the semi-crystalline material. The amorphous material imparts flexibility and lowers brittleness. The adhesive blend (a) and (b) is loaded with the particulate filler (c). This adhesive blend cures upon exposure to water moisture and/or vapor. In one preferred embodiment, the blended adhesive composition has components (a), (b), and (c) present in the weight proportions of: 6 to 37% (a), 27 to 80% (b), and 5 to 55% (c), with the proviso that the sum of (a)+(b)+(c) equals 100%, and the weight ratio of (b)/(a) is greater than 1.2. The filled adhesive/sealant composition of the invention preferably has a toolability time of from 5 to 50 minutes before cure.

Further, the adhesive/sealant composition of this invention is extremely versatile and can be used to bond a wide variety of substrate materials including metal, wood, concrete, cellulosic paper, plasterboard, sheet rock, and plastics such as polyvinyl chloride ("PVC"), polystyrene, and acrylonitrile-butadienestyrene (ABS) rubbers under a wide variety of conditions. In one embodiment, the reactive hot melt system system is effective to bond plastic (e.g. PVC) plumbing and drain fixtures. In another embodiment, the reactive system is is useful in the building construction field such as a sealant applied into crevices between adjoining pieces of sheet rock and tooled smooth, or to bond wood paneling, or as a sealant/adhesive for fiber board and particle board products. As the reactive hot melt sysytem of the present invention is substantially nonshrinkable upon and after cure, it especially well-suited for filling of crevices and holes in substrates which filled adhesive/sealant can be tooled smooth with the adjoining substrate surfaces before cure.

Other features, advantages, and further methods of practicing the invention will be better understood from the following description of the preferred embodiments of the present invention.

DETAILED DESCRIPTION OF THE PREFERRED EMBODIMENTS

Reactive hot melt adhesive systems, such as reactive hot melt urethane systems, can combine the rapid set or crystallization times of conventional nonreactive hot melt adhesives with the high bond strengths of a curing system. For example, like conventional hot melts, the reactive hot melt urethane adhesives are solid at room temperature (about 25° C.), melt to a viscous liquid when heated to moderate temperatures (82°–121° C.), and are applied in the molten state. The adhesive then cools to a solid state to provide initial bond strength. The urethane-based reactive hot melt systems, in particular, are superior to conventional noncuring hot melt adhesives which lack resistance to solvents and heat, have lower bond strengths, and which creep under load because they are non-curing.

However, it was observed by the present inventor that prior reactive hot melt adhesive caulks and sealants, in particular, have peculiar difficulties in terms of back-melt problems in the delivery device, poor wetting characteristic, poor adhesion if tooling is not performed immediately, and long cure time requirements. It has been discovered that the inclusion of filler providing an overall thermal conductivity in the adhesive/sealant composition of less than 0.30 W/m.°C. in reactive hot melt adhesive systems having a heat of crystallization in joules/gram of −2 or lower provides heretofore unreported control over the thermal and curing properties of the adhesive. For instance, while not desiring to be bound by theory, it nonetheless is believed that the extended toolability time achieved by the glass bubble filled adhesives of this invention provides additional time for the prepolymer adhesives to orient at the adhesive-substrate interface; thereby increasing the strength of the adhesive bond to the substrate, among other advantages.

In general, the particulate filler includes cellular glass or ceramic materials loaded into the adhesive in relatively high amounts by volume, generally 30 to 90% by volume of the total volume of the adhesive system. In one preferred embodiment of the invention, the particulate filler is devoid of any thermoplastic or thermosetting materials. For example, thermoplastic bubbles can be undesirable as being too susceptible to heat damage from the heat of the molten adhesive and during cure. On the other hand, thermosetting bubbles can be undesirable as they can interfere with the cure reaction mechanism of the adhesive in manners which cannot be controlled.

One preferred filler is glass bubbles used in an amount of 30 to 90%, preferably 40–80%, by volume, of the overall adhesive/sealant composition. If the amount of glass bubble filler becomes less than 30% volume of the overall adhesive/sealant composition, the peel adhesion property of the adhesive/sealant tends to become unsatisfactorily low. The glass bubbles are selected of a material and wall thickness and are added in an amount to provide the requisite thermal conductivity of less than 0.30 W/m.°C., preferably less than 0.20 W/m.°C., when added in amounts of from 30 to 90% by volume. The glass bubble material can be an alkali or alkaline silicate material. The glass bubbles have a specific gravity of from about 0.1 to about 2.2, and a bulk density of about 0.1 to about 0.90 g/cc. The average wall thickness of the glass bubbles can be in the range of 0.5 to 2.0 micrometers. The glass bubble particle size can be from about 5 to 125 micrometers. The microballons are preferably less than 80 microns in external diameter. Smaller diameters can raise the viscosity of the adhesive to levels difficult to handle and tool. Again, the glass bubbles are used in amount sufficient to constitute about 30 to about 90 volume percent, and preferably 40–80 volume percent based on total volume of the adhesive and additives, inclusive of the glass bubbles.

Suitable glass bubbles as the filler used in the adhesive composition of the present invention include soda-lime-borosilicate glass bubbles having the trade designation Scotchlite™ K-20 Glass Bubbles and are available from 3M Company, Saint Paul, Minn. 55144. The Scotchlite™ K-20 glass bubbles are about 60 micrometers in external diameter and have a specific gravity of 0.20.

Another suitable glass bubble filler have the trade designation Scotchlite™ S-22 glass bubbles available from 3M Company, Saint Paul, Minn. 55144. Scotchlite™ S-22 glass bubbles are soda-lime-borosilicate glass bubbles of about 30 micrometers in external diameter and having a specific gravity of 0.22. Yet another suitable glass bubble filler have the trade designation Scotchlite™ S-60 Glass Bubbles and are available from 3M Company, Saint Paul, Minn. 55144, which are soda-lime-borosilicate glass bubbles of about 30 micrometers in external diameter and having a specific gravity of 0.60.

The filler can also be a ceramic material. For example, suitable ceramic filler include filler having the trade designation Zeeospheres™ type 850 and available from Zeelan Industries, Inc. Saint Paul, Minn. 55101. Zeeospheres™ type 850 are hollow, ceramic (silica-alumina alloy) spheres with relatively thick walls having a median particle size (by total population) of 17 micrometers in external diameter. Another suitable ceramic filler has the trade designation Z-Light™ W-1012 spheres also available from Zeelan Industries, Inc. Saint Paul, Minn. 55101. Z-Light™ W-1012 are hollow, ceramic (silica-alumina alloy) spheres having an average particle size of 100 micrometers in external diameter and a specific gravity of 0.7. Low density ceramic spheres containing a multiplicity of minute, independent, closed air cells surround by a tough outer shell are useful, such as the filler having the trade designation Macrolite™ ML 3050 and available from 3M Company, Saint Paul, Minn. 55144, which have a median particle size of about 450 micrometers in external diameter.

As to the reactive hot melt curable resins susceptible to improvement by the addition of the filler, such as glass bubbles, imparting the herein-mentioned requisite thermal conductivity, the resin should have a crystallization temperature of between about 25° C. to about 70° C. Also, the reactive hot-melts contemplated for use in the present invention have a heat of crystallization in joules/gram of −2 or lower (meaning −2 and negative values greater in absolute magnitude than the integer 2). The reactive hot melt versions of the adhesive-sealant of the present invention can be light-curing, moisture-curing or heat-curing when they meet the aforesaid crystallization temperature.

As one illustration of suitable resin for the present invention, there is a blend of certain isocyanate-terminated polyurethane prepolymers which provide a moisture-curable hot-melt adhesive system. The blend comprises first and second prepolymers. That is, the blend comprises a first isocyanate-terminated polyurethane prepolymer (hereinafter referred to as "the first polyurethane prepolymer" or "the first prepolymer"), a second isocyanate-terminated polyurethane prepolymer (hereinafter referred to as "the second polyurethane prepolymer" or "the second prepolymer"). Each of the first and second prepolymers comprises the reaction product of a hydroxy-functional material and a polyisocyanate.

More particularly, the first prepolymer comprises the reaction product of an at least essentially semicrystalline hydroxy-functional material and a polyisocyanate. By "essentially semicrystalline" it is meant that the first hydroxy-functional material exhibits both a crystalline melting temperature(Tm) and a glass transition temperature (Tg). The at least essentially semicrystalline hydroxy-functional material preferably has an essentially linear, saturated, aliphatic structure, a crystalline melting temperature between about 5° C. and 120° C. (more preferably between about 40° C. and 105° C.), a glass transition temperature less than about 0° C., and has a heat of crystallization (ΔH) of lower than −2 joules per gram. Included within the scope of "at least essentially semicrystalline" materials are those materials which may be regarded as essentially crystalline.

The polyester polyol used to prepare the first prepolymer typically has a number average molecular weight (Mn) of at least about 1000, preferably at least between about 1000 and about 5000, and most preferably between about 1500 to about 3000. At a Mn below about 1000, the resultant prepolymer is soft and may lack cohesive strength in the uncured state. At a Mn above about 5000, the resultant prepolymer tends to be viscous which increases the difficulty of depositing acceptably thin lines of adhesive on a substrate.

If the hydroxy-functional material of the first prepolymer is provided in the form of a polyester polyol, it may comprise the reaction product of a polyol, for example, a diol, and a polyacid, for example, a dicarboxylic acid.

The at least essentially semicrystalline hydroxy-functional material may comprise the reaction product of an alphatic diol having from about 2 to 10 methylene groups and a dicarboxylic acid having from about 2 to 10 methylene groups. Diols useful in forming the at least essentially semicrystalline hydroxy-functional material may comprise, for example, those having from 2 to 10 methylene groups such as ethylene glycol, 1,4-butanediol, 1,5-pentanediol, 1,6-hexanediol, 1,8-octanediol, and 1,10-decanediol. Cycloaliphatic diols such as, for example, 1,4-cyclohexanediol and 1,4-cyclohexanedimethanol may also be employed.

Dicarboxylic acids useful in preparing the hydroxy-functional material of the first prepolymer include, for example, those having from about 2 to 10 methylene groups such as succinic acid, glutaric acid, adipic acid, sebacic acid, azelaic acid, and 1,12-dodecanedioic acid, derivative thereof, and mixtures thereof. Included within the scope of useful acids are acid derivatives such as acid anhydrides, acid halides, and alkyl esters such as, for example, the methyl and ethyl esters.

Suitable essentially semicrystalline polyester polyols useful in the invention include, for example, polyhexamethylene adipate, polybutylene adipate, poly-epsilon-caprolactone, and combinations thereof. Preferably, the essentially semicrystalline polyester polyol is polyhexamethylene adipate and most preferably, 1,6-polyhexamethylene adipate. 1,6-polyhexamethylene adipate is the reaction product of 1,6-hexanediol and adipic acid.

Examples of commercially available essentially semicrystalline polyester polyols useful in the invention include, for example, FORMREZ 66-20, an adipate polyester diol (poly [1,6 hexane adipates] (OH =20.8)) available from Witco Chemical Company; LEXOREZ 1130-30P from Inolex Chemical Co.; RUCOFLEX 105-37 from Ruca Polyair Corporation; DYNACOLL 7360 from Hülls America; TONE 1271 from Union carbide, and combinations or mixtures thereof.

It has been noted hereinabove that the semicrystalline polyester polyols may be defined in part with reference to whether they display a Tg and/or a Tm. The presence and/or absence of a glass transition temperature and a crystalline melting point are techniques often used to characterize semicrystalline and amorphous (glassy) polymers. The two thermal transitions, Tg and Tm, can be quantitatively determined by measuring changes in specific volume and heat capacity through accepted analytical procedures such as differential scanning calorimetry (DSC). More particularly, Tg and Tm were measured with a Perkin-Elmer 7 Series Thermal Analysis System programmed to scan at a rate of 20° C./min. The midpoint of the endothermic peak was considered to be the Tg. Tm was considered to be the temperature at the apex of the endothermic peak. These techniques are described more fully in *Thermal Characterization of Polymeric Materials,* edited by Edith A. Turi (published 1981 by Academic Press, York, York).

The essentially amorphous material used in the preferred adhesive of the invention is preferably a polyether polyol, more preferably, a polyoxyalkylene polyol where the alkylene is $C_2$-$C_3$. Representative polyoxyalkylene polyols include poly(1,2 and 1,3-propylene oxide) glycol. A suitable commercial source of polyoxyalkylene polyol for use in this invention as the essentially amorphous material in the adhesive are the "POLY G" polyether diol series from Olin Corp. Among this series, there are "Poly G 55-112" having a molecular weight of 1,000; "POLY G 55-56" which is a 2000 MW polyether diol with 70–88% primary —OH's; "POLY G 55-37" having a molecular weight of 3,000; "POLY G 55-28" having a molecular weight of 4,000. Another useful polyether diol is "PPG-2025", a 2,000 MW polyether diol with secondary —OH's available from ARCO Chemicals. One preferred hydroxy-functional material for the second prepolymer is the polypropylene oxide ether glycol Poly G 55-56 (2000 MW polyether diol/70–88% primary-OH, Olin Corp.

Polyisocyanates which can be reacted with the hydroxy-functional materials to form the first and second prepolymers used in one preferred embodiment of the instant invention may be aliphatic or aromatic. Preferably, they are aromatic diisocyanates such as diphenylmethane-2,4'-diisocyanate and/or diphenylmethane 4,4'-diisocyanate (MDI); tolylene-2,4-diisocyanate and -2,6-diisocyanate (TDI) and mixtures thereof. Other examples include: naphthylene-1,5-diisocyanate; triphenylmethane-4,4', 4''-triisocyanate; phenylene-1,3-diisocyanate and -1,4-diisacyanate; dimethyl-3, 3'-biphenylene-4,4'-diisocyanate; diphenylisopropylidine-4, 4'-diisocyanate; biphenylene diisocyanate; xylylene-1,3-diisocyanate and xylylene- 1,4-diisocyanate.

A list of useful commercially available polyisocyanates is found in the *Encyclopedia of Chemical Technology*, Kirk-Othmer, 2nd Ed., vol. 12, pp. 46–47, Interscience Pub., N.Y. (1967), which is incorporated herein by reference. Especially preferred isocyanates include diphenylmethane-4,4'-diisocyanate and its isomers and mixtures thereof.

Isocyanate-functional derivative(s) of MDI and TDI may be used, such as liquid mixtures of the isocyanate-functional derivative with melting point modifiers (e.g., mixtures of MDI with polycarbodiimide adducts such as ISONATE 143L, commercially available from Dow Chemical Company). Small amounts of polymeric diphenylmethane diisocyanate, preferably 10% or less by weight of the total isocyanate components, (e.g., PAPI, and the series PAPI 20, commercially available from Dow Chemical Company, the MONDUR M, MR and MRS series of isocyanates commercially available from Mobay Chemical Corp., and RUBINATE M, commercially available from ICI Chemicals, Inc.) may be included. Blocked isocyanate compounds formed by reacting aromatic isocyanates or the above-described isocyanate-functional derivatives with blocking agents such as ketoximes and the like are also included within the invention. Such blocked isocyanate-functional derivatives will, for convenience, be regarded herein as isocyanate-functional derivatives of MDI and TDI.

In one preferred embodiment of the invention, the reactive hot melt adhesive/sealant includes an essentially semicrystalline hydroxy-functional material comprising polyhexamethylene adipate, a polyether glycol comprising polyether diol, and a polyisocyanate comprising diphenylmethane diisocyanate. Further, this composition preferably contains the polyether diol and the polyhexamethylene adipate in a weight ratio of 15:85 to 85:15, respectively, more preferably, 25:75 to 75:25, respectively, and the diphenylamine diisocyanate is present in an excess of hydroxyl equivalents. If the amount of polyether diol exceeds 85 per 100 parts of the combined polyether diol and polyhexamethylene adipate, the adhesive properties are adversely affected and decreased. On the other hand, if the amount of polyhexamethylene adipate exceeds 85 per 100 parts of the combined polyether diol and polyhexamethylene adipate, the adhesive/sealant crystallizes too rapidly and tooling time becomes severely shortened.

The prepolymers useful herein may be prepared by techniques that are well known in the art. For example, prepolymers suitable in the invention may be formed by reacting a mixture of the hydroxy-functional polymers and the polyisocyanate(s) in a suitable vessel. Alternatively, the prepolymers may be prepared by reacting each of the hydroxy-functional polymers separately with the polyisocyanate(s) followed by blending of the resultant prepolymers. Still further, the prepolymers may be prepared by forming one prepolymer and subsequently forming the other prepolymer or prepolymers in the first.

Typically, the components are mixed at an elevated temperature using conventional mixing techniques. It is preferred to mix the components under anhydrous conditions. Generally, the prepolymers are prepared without the use of solvents although solvents may be employed if desired.

The isocyanate equivalents should be present in the reaction mixture in an amount greater than the hydroxyl equivalents. The equivalent ratio of isocyanate-to-hydroxyl (NCO/OH), sometimes referred to hereinafter as the isocyanate index, is preferably from about 1.2/1 to about 10/1 and especially preferably from about 1.5/1 to 2.2/1.

The compositions of the invention may further include isocyanate-terminated polyurethane prepolymers other than the prepolymers described above. The additional prepolymers may be added to the prepolymer blends of the invention for a variety of purposes such as to further adjust the open time, green strength build-up, tack, final strength, compatibility, adhesion etc. of the resultant mixture.

Similarly, other monomeric materials may also be included in the polymerization mixture so as to incorporate them directly into either the hydroxy-functional materials of the prepolymers or the prepolymers themselves. Examples of such monomeric materials which may be used to modify the polyester polyols include neopentyl glycol, ethylene glycol, butanediol, hexanediol, succinic acid, sebacic acid, terephthalic acid, orthophthalic acid, etc. The exact level of "other monomer" utilized is not critical to the invention provided it does not materially negatively affect the adhesion of the composition. Typically, the other monomers may comprise up to 50 mole percent of the polymerization mixture.

Also, the inventive adhesive compositions may include an effective amount of catalyst or reaction accelerator such as tertiary amines; metal-organic compounds, such as dibutyl tin dilaurate; co-curatives, and the like. An effective amount of a catalyst is preferably from about 0.005 to 2 percent by weight of the total prepolymer weight. More preferably, the catalyst is present at a level of about 0.01 to about 0.5 percent, based on the total weight of the prepolymers employed. Preferred catalysts are tertiary amines. Especially preferred catalysts are the tertiary amines known as bis [2-(N,N-dialkylamino)alkyl]ether(s) (sometimes known as "bis ethers"). Suitable bis ethers are described, for example, in U.S. Pat. No. 3,330,782, and include, for example, bis [2-(N,N-dimethylamino)ethyl] ether, bis [2-(N,N-dimethylamino)- 1-methylethyl]ether, and 2-(N,N-dimethylamino)ethyl- 2-(N,N dimethylamino)-1-methylethyl ether. A preferred bis ether is bis [4,4'-morpholino)- 2-ethyl]ether (DMDEE) commercially available from Texaco Chemical Company, Houston, Tex. 77227, under the designation THANCAT DMDEE.

The mode of application of the adhesive formulations of the present invention include hand-held guns and valved dispensing nozzles. In addition to hot-melt bonding, the adhesive composition may be applied, cooled and later heat-activated, i.e., remelted.

Sodium borate exudes from the surfaces of borosilicate glass microballoons when used as the particulate filler. Therefore, in the practice of the present invention, a strong acid, such as phosphoric acid or sulfuric acid, should be added to the adhesive formulation to inhibit the alkalinity imparted by the sodim borate to prevent an undesired problem of inadvertent isocyanate trimerization in the adhesive otherwise caused by the presence of the sodium borate in the adhesive composition. For example, about 1 gram to about 3.2 grams of 86.7% J. T. Baker reagent grade phosphoric acid per kg of the unfilled adhesive is used in this regard. The amount of phosphoric acid can vary depending on the weight amount of borosilicate glass bubbles employed in the adhesive. For example, at a lower addition level of from about 10 to about 20% by weight borosilicate bubbles based on the total weight of filled adhesive, the phosphoric acid is added in amounts of about 1 gram per kg of unfilled adhesive, while, at an upper addition level of from about 30% to about 40% by weight borosilicate glass bubbles based on total weight of filled adhesive, the phosphoric acid is added in amounts of about 3 grams per kg of unfilled adhesive, to ensure that the alkalinity inhering to the borosilicate bubble material is adequately neutralized. Also, it is preferrable to add trace amounts of moisture scavengers to the strong acids, if used. Suitbale moisture scavengers include molecular sieves, suc as zeolite, and anhydrides compounds such as maleic anhydride or acetic anhydride.

Other ingredients or adjuvants also may be employed with the blends of the invention to impart to or modify particular characteristics of the composition but only to the extent that the additives do not interfere with or prevent the composition from achieving the physical properties of a thermal conductivity of less than 0.3 W/m.°C. and a heat of crystallization of −2 grams/joule or lower. These ingredients are included in the overall blends or mixtures of the invention rather than being incorporated into the constituent components thereof. The adjuvants should be added only at a level that does not materially adversely interfere with the adhesion of the composition. The adjuvants may comprise up to 50 weight percent of the composition either individually or in combination. For example, chain-extension agents (e.g., short chain polyols such as ethylene glycol or butanediol); fillers (e.g., carbon black); metal oxides such as zinc oxide; and minerals such as talc, clays, silica, silicates, and the like), thermoplastic resins; plasticizers; antioxidants; pigments; U.V. absorbers; and adhesion promoters such as silanes, and the like may be included to modify set time, open time, green strength build-up, tack, flexibility, adhesion and the like.

EXAMPLES

All parts, percentages, ratios, and the like, are by weight in the following examples unless indicated otherwise.

General Preparation Procedure for the Isocyanate-Terminated Polyurethane Prepolymer 4,4'-Diphenylmethane diisocyanate (MDI) was added to a 500 ml - four (4) neck resin flask fitted with a gas inlet, gas outlet, stirrer and thermometer. The MDI was heated to 50° C. until completely melted with efficient stirring under a nitrogen atmosphere. After the MDI was melted, the hydroxy-functional materials were added sequentially (although their addition as a premixed blend also is within the scope of the invention). That is, the preferred order of addition is the essentially semicrystalline polyester polyol, and then the polyether glycol; although this sequence can be reversed. In any event, for purposes of the examples described herein, the semicrystalline polyester polyol was added first followed by adding the amorphous polyether glycol. Stirring and heating at 110° C. under a dry nitrogen purge were continued for about 30 minutes after the addition of each of the semicrystalline polyester polyol and the polyether glycol. Then, sequentially, phosphoric acid and 4,4'-(oxydi- 2,1-ethanediyl) bis-morpholine (THANCAT DMDEE, an endcapping and cure promoting catalyst available from Texaco Chemical Co.) were added with about 5 minutes of mixing conducted after the addition of each of these two components. The reaction conducted and maintained throughout at a heated temperature 110° C. and under a dry nitrogen purge. Stirring was continued under vacuum for about 5 minutes at 110° C. A particulate filler, if any as indicated in the examples, then was added to the above mixture at 100° C. in a four neck resin flask fitted with a stirrer, nitrogen inlet and outlet, and thermometer, and mixed for 30 minutes and degassed. Then, the resulting mixture was poured into nitrogen-purged 24 oz. (680 grams) aluminum squeeze tube containers which were then sealed.

COMPARATIVE EXAMPLES 1–3 AND EXAMPLE 1

A series of isocyanate-terminated polyurethane prepolymers was made generally as described above in the General Preparation Procedure. The specific components and their amounts of addition are described below. The prepared compositions were tested for various properties such as bead characteristics, toolability, shore A hardness, viscosity, flex and/or adhesion to metal and polymeric substrates as indicated. Component values are reported in parts by weight.

COMPARATIVE EXAMPLE 1

A prepolymer was prepared with the components and protocol indicated in Table 1.

TABLE 1

| Addition Sequence | Amount (grams) | Component | Mix Time |
|---|---|---|---|
| 1 | 42.2 | Mondur M[1] | Until Melted |
| 2 | 100.0 | Formrez ®66-20[2] | 30 minutes |
| 3 | 150.0 | Poly G ®-55-56[3] | 30 Minutes |
| 4 | 0.3 | $H_3PO_4$[4] | 5 Minutes |
| 5 | 0.56 | DMDEE[5] | 5 Minutes |

[1]Diphenylmethane-4,4'-diisocyanate (MDI) available from Miles Inc., Pittsburgh, PA 15205
[2]Adipate polyester diol [poly(1,6 hexane adipates)] having a hydroxyl number of 20.8 available from Witco Corp., Chicago, IL.
[3]2000 MW polyether diol with 70–88% primary hydroxyl functionality available from Olin Corp., Stamford, CT 06904
[4]86.7 wt % reagent grade phosphoric acid available from J. T. Baker Chemical Co., Phillipsburg, NJ 08865
[5]Bis(4,4'-morpholino-2-ethyl) ether available from Texaco Chemical Company, Houston, TX 77227

The resulting prepolymer had a viscosity of 3700 Centipoise at 120° C. (measured using a Brookfield Thermo Cell at 10rpm with a number 27 spindle) and a toolability time of from about 45 to 120 minutes as shown in Table 2.

Toolability time was determined by extruding a series of 15 centimeter diameter long substantially round beads of adhesive onto base coat-clear coat painted steel test panels designated Code: APR21553, Batch #: 50712312 available from ACT Laboratories, Inc., Hillsdale, Mich. 49242. At various elapsed cooling times (reported in minutes), the adhesive beads were tooled to a produce a 7 millimeter radius semi-circular cross-section by running a tooling wheel back-and-forth over the bead. The tooling wheel is comprised of a 5 centimeter diameter, 7 millimeter thick polyethylene wheel having a 7 millimeter radius semi-circle machined into the outer circumference of the wheel.

EXAMPLE 1

Comparative Example 1 was repeated except that 53.3 grams of K-20 soda-lime-borosilicate glass bubbles were added to the prepolymer following the DMDEE charge. K-20 glass bubbles (about 60 micrometers in diameter) have an average particle density of 0.20 grams per cubic centimeter are designated Scotchlite™ K-20 Glass Bubbles and are available from 3M Company, Saint Paul, Minn. 55144. The resulting composition was mixed for 30 minutes at 110° C. It had a viscosity of 40,000° Centipoise at 120° C. (measured using a Brookfield Thermo Cell at 0.5 rpm equipped with a number 29 spindle) and a toolability time of from about 5 to 50 minutes as shown in Table 2.

COMPARATIVE EXAMPLE 2

For additional comparison purposes, a commercially-available prepolymer having no glass bubble filler was tested which was obtained under the trade designation Jet Melt 3792-TC, a hot melt adhesive available from 3M Company, Inc., Saint Paul, Minn. 55144.

COMPARATIVE EXAMPLE 3

For additional comparsion purposes, a commercially-available prepolymer having no glass bubble filler was tested which was obtained under the trade designation TS-230, a moisture curable hot melt adhesive available from 3M Company, Inc., Saint Paul, Minn. 55144.

The bead quality was rated as unacceptable, marginal, and acceptable. An "unacceptable" bead cannot be tooled at short times before the adhesive cools to the crystallization temperature because it is too "runny" to maintain the semi-circular tooled shape and in some cases sticks to the tooling wheel. At long times, the adhesive cools below the crystallization temperature and becomes so stiff and hard it cannot be shaped by hand tooling. Such unacceptable beads were given a rating of 0 in Table 2 below. A "marginal" bead is defined as one that is able to hold or assume part of the semi-circular profile. Such marginal profiles have flat tops with circular arcs defining the profile between the flat top and painted substrate surface. Marginal beads were given a rating of 1. An "acceptable bead" is defined as bead that develops the full semi-circular profile when tooled with moderate hand pressure and does not stick to the tooling wheel. Acceptable beads were given a rating of 2. After the adhesive cooled and hardened to the point it could no longer be shaped with the tooling wheel, it was given a rating of 0, and the test was terminated.

TABLE 2

| Time (Min.) | Comparative Ex. 1 | Example 1 | Comparative Ex. 2 | Comparative Ex. 3 |
| --- | --- | --- | --- | --- |
| 5 | 0 | 2 | 1 | 0 |
| 10 | 0 | 2 | 1 | 1 |
| 15 | 1 | 2 | 0 | 0 |

TABLE 2-continued

| Time (Min.) | Comparative Ex. 1 | Example 1 | Comparative Ex. 2 | Comparative Ex. 3 |
| --- | --- | --- | --- | --- |
| 20 | 1 | 2 | 0 | 0 |
| 25 | 1 | 2 | Test Terminated | Test Terminated |
| 30 | 1 | 2 | | |
| 35 | 1 | 2 | | |
| 45 | 2 | 2 | | |
| 50 | 2 | 2 | | |
| 60 | 2 | Not Measured | | |
| 90 | 2 | Not Measured | | |
| 120 | 2 | Not Measured | | |
| 150 | 0, No flow | Not Measured | | |
| 180 | 0, No flow | Not Measured | | |

EXAMPLES 2–6

Using the procedure of Example 1, the ratio of polyether to polyester diol was varied to observed what effect changing the ratio had on viscosity (in centapoise), toolability time, and hardness increase at each of 10 minutes and after 2 hours. The results are shown in Table 3.

TABLE 3

| Run | Ether/Ester (% wt. ratio) | Viscosity (Cp.) | Tool Time (Min.) | Shore A (10 min.) | Hardness Increase (After 2 hours) |
| --- | --- | --- | --- | --- | --- |
| 2 | 70/30 | 28,000 | 5 to 50 | 28.9 | 52% |
| 3 | 65/35 | 34,000 | 5 to 50 | 34.6 | 64% |
| 4 | 60/40 | 40,000 | 5 to 60 | 55.8 | 28% |
| 5 | 55/45 | 74,000 | 5 to 60 | 69.8 | 29% |
| 6 | 50/50 | 116,000 | 5 to 15 | 76.4 | 14% |

EXAMPLES 7–11

In this series of runs, the polyether diol was changed to 1000 MW polyether diol designated Poly G® 55-112 available from Olin Corp. The polyester diol was not changed, i.e., it remained Formrez® 55-56 available from Witco Corporation.

TABLE 4

| Run | Ether/Ester (% wt. ratio) | Viscosity (Cp.) | Tool Time (Min.) | Shore A (10 min) | Hardness Increase (After 2 hours) |
| --- | --- | --- | --- | --- | --- |
| 7 | 70/30 | 14,000 | 5 to 25 | * | -- |
| 8 | 65/35 | 10,000 | 5 to 50 | 35.1 | 46% |
| 9 | 60/40 | 18,000 | 5 to 50 | 41.4 | 44% |
| 10 | 55/45 | 30,000 | 5 to 50 | 56.4 | 35% |
| 11 | 50/50 | 32,000 | 5 to 25 | 61.5 | 37% |

*Too soft to measure Shore A. Also, test terminated without hardness increase measurement.

EXAMPLES 12–16

In this series of runs, the polyether diol was changed to 3000 MW polyether diol designated Poly G® 55-37 available from Olin Corp. The polyester diol was not changed, i.e., it remained Formrez® 55-56 available from Witco Corporation.

TABLE 5

| Run | Ether/Ester (% wt. ratio) | Viscosity (Cp.) | Tool Time (Min.) | Shore A (10 min) | Hardness Increase (After 2 hours) |
|---|---|---|---|---|---|
| 12 | 70/30 | 44,000 | 5 to 50 | 16.9 | 136% |
| 13 | 65/35 | 92,000 | 5 to 50 | 38.1 | 52% |
| 14 | 60/40 | 120,000 | 5 to 50 | 51.7 | 26% |
| 15 | 55/45 | 112,000 | 5 to 15 | 65.9 | 29% |
| 16 | 50/50 | 102,000 | 5 to 15 | 70.6 | 30% |

EXAMPLES 17–21

In this series of runs, the polyether diol was changed to 4000 MW polyether diol designated Poly G® 55-28 available from Olin Corp. The polyester diol was not changed, i.e., it remained Formrez® 55-56 available from Witco Corporation.

TABLE 6

| Run | Ether/Ester (% wt. ratio) | Viscosity (Cp.) | Tool Time (Min.) | Shore A (10 min) | Hardness Increase (After 2 hours) |
|---|---|---|---|---|---|
| 17 | 70/30 | 34,000 | too soft | — | — |
| 18 | 65/35 | 38,000 | too soft | — | — |
| 19 | 60/40 | 86,000 | too soft | 6.5 | 129% |
| 20 | 55/45 | 104,000 | 5 to 50 | 11.3 | 145% |
| 21 | 50/50 | 124,000 | 5 to 50 | 35.6 | 39% |

For runs 17 and 18, the adhesive/sealant was too soft to measure tool time and 10 minute Shore A.

EXAMPLES 22–26

In this series of runs, the polyether diol was changed to 2000 MW polyether diol containing secondary hydroxyls designated ARCOL® PPG 2025 available from ARCO Chemical Company, Newtown Square, Pa. 19073. The polyester diol was not changed, i.e., it remained Formrez® 55-56 available from Witco Corporation.

TABLE 7

| Run | Ether/Ester (% wt. ratio) | Viscosity (Cp.) | Tool Time (Min.) | Shore A (10 min) | Hardness Increase (After 2 hours) |
|---|---|---|---|---|---|
| 22 | 70/30 | 18,000 | 15 to 50 | 15.3 | 91% |
| 23 | 65/35 | 34,000 | 5 to 50 | 45.0 | 11% |
| 24 | 60/40 | 76,000 | 5 to 50 | 62.1 | 5% |
| 25 | 55/45 | 50,000 | 5 to 15 | 66.3 | 38% |
| 26 | 50/50 | 143,000 | 5 | 87.6 | >14% |

The results of these runs show that maximum toolability of 5 to 50 minutes, acceptable initial hardness (10 minute), and hardness increase are achieved for the most economical 70/30 Ether/Ester % weight ratio for isocyanate terminated ether prepolymers having number average molecular weights of 2,000 and 3,000.

EXAMPLES 28–35

These examples investigated how toolability affects the range of 180° peel adhesion. A large, about 3.2 kilogram) master-batch of unfilled adhesive was made using the General Procedure for Making the Prepolymer of Comparative Example A with the following amounts. The master-batch for Examples 28, 29, 31–34 had the composition shown in Table 8.

TABLE 8

| Quantity (grams) | Ingredient |
|---|---|
| 471.2 | Mondur ™ M |
| 825.0 | Formrez ® ™ 66-20 |
| 1925.0 | PolyG ™ 55-56 |
| 6.16 | DMDEE |
| 3.3 | Phosphoric acid |

Following the addition of the phosphoric acid charge the unfilled master-batch was degassed for 20 minutes at 110° C. and transferred to 750 milliliter aluminum tubes. The unfilled master batch had a thermal conductivity of 0.17 W/m.°C. at 44.2° C.; a $\Delta H$ of $-22.3$ Joules/gram measured according to ASTM E793 using a Perkin-Elmer Series 7 Thermal Analysis System; and a Shore A (10 min.) of 14.4

For Example 30 only, a separate master batch was prepared having the formulation same set forth in Table 8 except that the amount of phosphoric acid was increased to 9.8 grams. This increase was required due to the large amount of sodium lime borosilicate added to the formulation by virtue of the relatively thick-walled glass bubble filler of that run.

Filled adhesives were prepared by adding about 250 grams of the melted master-batch unfilled adhesive to a four (4) neck resin flask equipped with dry nitrogen purge. Sufficient filler to produce a 50% by volume filler loading filled adhesive was added to flask and stirred for 30 minutes at 110° C. and transferred to 750 milliliter aluminum storage tubes. The exact weight of master-batch and filler is shown in Table 9. A description of the particular filler used in each example is indicated in Table 9 and the footnotes.

TABLE 9

| Run | Type of Filler Used | Qty. of Filler (grams) | Qty. Master-Batch (grams) |
|---|---|---|---|
| 28 | K-20 Glass Bubbles | 44.1 | 243.1 |
| 29 | S-22 Glass Bubbles | 48.4 | 242.0 |
| 30 | S-60 Glass Bubbles | 139.1 | 255.1 |
| 31 | Aluminum Spheres | 633.4 | 258.0 |
| 32 | Calcium Carbonate | 668.9 | 271.5 |
| 33 | Zeeospheres | 460.0 | 241.0 |
| 34 | Macrolite | 246.0 | 258.0 |
| 35 | Z-Light | 189.8 | 264.0 |

28) Soda-lime-borosilicate glass bubbles (about 60 micrometers in average external diameter) having a specific gravity of 0.20 and a thermal conductivity of 0.03 W/m · °C. designated Scotchlite ™ K-20 Glass Bubbles available from 3M Company, Saint Paul, MN 55144.
29) Soda-lime-borosilicate glass bubbles (about 30 micrometers in average external diameter) having a specific gravity of 0.22 designated Scotchlite ™ S-22 Glass Bubbles available from 3M Company, Saint Paul, MN 55144.
30) Soda-lime-borosilicate glass bubbles (about 30 micrometer in average external diameter) having a specific gravity of 0.60 grams designated Scotchlite ™ S-60 Glass Bubbles available from 3M Company, Saint Paul, MN 55144.
31) Spherical atomized aluminum (99.5% min.) powder having an average diameter of 38 micrometers, a specific gravity of 2.71, and a thermal conductivity of 237 W/m · °C. designated S-892 Spherical Atomized Powder available from Reynolds Metals Co., Louisville, KY 40211.

TABLE 9-continued

| Run | Type of Filler Used | Qty. of Filler (grams) | Qty. Master-Batch (grams) |
|---|---|---|---|

32) Calcium carbonate having an average particle size of about 10 micrometers and an oil absorption (rub out) in the range of from 5.0 to 9.0 and a thermal conductivity of 3.30 W/m · °C.
33) Hollow, ceramic (silica-alumina alloy) spheres with thick walls having a median particle size of 17 micrometers and a specific gravity of 2.1 designated Zeeospheres ™ type 850 available from Zeelan Industries, Inc. Saint Paul, MN 55101.
34) Low density ceramic spheres containing a multiplicity of minute, independent, closed air cells surround by a tough outer shell having a median particle size of about 450 micrometers, a specific gravity of 1.05, and a thermal conductivity of 0.11 W/m · °C. designated Macrolite ™ ML 3050 available from 3M Company, Saint Paul, MN 55144.
35) Hollow, ceramic (silica-alumina alloy) spheres having an average particle size of 100 micrometers, a thermal conductivity of 0.09 W/m · °C., and a specific gravity of 0.7 grams per cubic centimeter designated Z-Light ™ W-1012 available from Zeelan Industries, Inc. Saint Paul, MN 55101.

Example 31 (aluminum powder filler) and Example 32 (calcium carbonate filler) are comparative examples to the present invention, while Examples 28–30 and 33–35 are examples representative of the present invention. The formulations of examples 28–35 were then evaluated as described below for various properties. The results are summarized below in Table 10 for examples 28–35.

TABLE 10

| Run | Therm. Cond.[1] | ΔH[2] | Shore A (10 min.) | % Incr.[3] | Tooled 180° Peel Adh. (10 min.[4]/ 30 min.[5]) | Failure Mode[6] |
|---|---|---|---|---|---|---|
| 28 | 0.16 (44.7) | −18.2 | 25.8 | 79% | 855/1795 | C |
| 29 | 0.12 (45.1) | −14.0 | 27.2 | 67% | 835/820 | 90% A/ 10% C |
| 30 | 0.21 (43.8) | −13.3 | 35.9 | 50% | 697/452 | A |
| 31 | 0.88 (41.1) | −6.7 | 57.1 | 9% | 102/66 | A |
| 32 | 0.53 (40.8) | −6.5 | 52.5 | 28% | 430/82 | A |
| 33 | 0.47 (41.6) | −4.8 | 50.6 | 13% | 123/52 | A |
| 34 | 0.29 (43.1) | −7.6 | 60.0 | −12% | 685/810 | A |
| 35 | 0.178 (44.6) | −10.8 | 45.3 | 48% | 641/263 | A |

[1]Thermal Conductivity (Watts/meter per °C.) was measured in accord with ASTM C518- using a Perkin-Elmer Series 7 Thermal Analysis System. Values in parentheses (....) are temperatures in °C. at which the thermal conductivity was measured.
[2]ΔH (Joules/gram) indicates the heat adsorbed (+) or liberated (−) at the crystalline/non-crystalline phase transition of the isocyanate terminated polyester prepolymer component measured in accord with ASTM E793 using a Perkin-Elmer Series 7 Thermal Analysis System. Heat is absorbed during DSC heating scan and liberated during DSC cooling scan.
[3]Percent increase (or decrease (−)) in Shore A hardness after 2 hours
[4]180° Peel Adhesion (Newtons/decimeter); adhesive tooled at 10 minutes.
[5]180° Peel Adhesion (Newtons/decimeter); adhesive tooled at 30 minutes.
[6]A cohesive failure is indicated as "C", and an adhesive failure is indicated as "A".

Further on footnotes 4) and 5) of Table 10, the tooled 180° Peel Adhesion values were measured using a Sintech 6W tensile test system available from MTS Systems Corp., Research Triangle Park, N.C. 22709. Duplicate test specimens were prepared by extruding two, 15 centimeter diameter rounded beads, approximately 20 millimeters apart onto thoroughly degreased, cold-rolled steel panels. The unpolished, 810 micrometer thick, cold rolled steel panels (10×30 centimeters), available under the designated code: APR10161, Batch# 20160216 from Advanced Coating Technologies (ATC) Laboratory, Hillsdale, Mich. 49242, were degreased with 3M General Purpose Adhesive Cleaner designated Part No. 08984 available from 3M Automotive Trades Div., Saint Paul, Minn. 55144. The beads on the first panel were tooled 10 minutes after extrusion, those on the second were tooled 30 minutes after extrusion. The tooled beads were allowed to cure for seven (7) days under ambient room conditions (approximately 25° C./50% relative humidity). After cure, the space between the beads was covered with Teflon™ tape and filled-in with Panel Adhesive Compound 30 designated Part Number 08456, which is available from 3M Company, Automotive Trades Division, Saint Paul, Minn. 55144. A strip of cotton cloth (3.8 by 35 centimeters) was placed on the panel adhesive and worked in using a tongue depressor. The specimens were aged under ambient conditions for an additional 3 days to cure the panel adhesive. The steel panel was clamped in the fixed (lower) jaws of the Sintech. The strip of cotton cloth was folded back 180 and the loose end clamped in the movable (upper) jaws of the Sintech. The specimens were pulled at a cross-head speed of 5 centimeters per minute. The maximum peel adhesion value and failure mode were noted and recorded.

EXAMPLES 36–41

This example shows the effect of changing the glass bubble volume loading of the filled adhesive. K-20 glass bubbles were added to the master-batch adhesive of Examples 28–35. The results are shown in Table 11. The 180° peel adhesion values are non-tooled peel adhesive values.

TABLE 11

| Run | % volume loading | (Non-Tooled) 180° Peel Adhesion (N/dm) | Failure Mode |
|---|---|---|---|
| 36 | 50 | 1365 | C |
| 37 | 40 | 875 | A |
| 38 | 30 | 610 | A |
| 39 | 20 | 580 | A |
| 40 | 10 | 640 | A |
| 41 | 0 | 630 | A |

The non-tooled 180° peel adhesion values were determined as follows for Examples 36–41. The molten adhesive for each example was uniformly spread on a cold rolled steel test coupon with a tongue depressor. Sufficient adhesive was applied to the coupon to assure that the thickness of the spread layer exceeded 50 micrometers. The test coupons (15×2.5 centimeters) were cut from the same panels used in the tooled 180° Peel Adhesion test for examples 28–35, i.e. Code: APR10161, Batch#: 20160216, from Advanced Coating Technologies (ATC) Laboratory, Hillsdale, Mich. 49242, which were likewise degreased with 3M General Purpose Adhesive Cleaner designated Part No. 08984 available from 3M Automotive Trades Div., Saint Paul, Minn. 55144. The spread adhesive films were allowed to cure for seven (7) days under ambient room conditions (approximately 25° C./50% relative humidity). After cure, the molten master batch adhesive was extruded over the cured adhesive test film and a strip of fine mesh stainless steel screen (3.8 by 35 centimeters) was worked into the molten, unfilled adhesive using a tongue depressor. The fully assembled test specimens were aged under ambient conditions for an additional 7 days to bond the screen to cured adhesive test film. Then, the steel panel was clamped in the fixed (lower) jaws of the Sintech. The strip of stainless steel screen was folded back 180 degrees and the loose end clamped in the movable (upper) jaws of the Sintech. The specimens were "pulled" at a cross-head speed of 5 centimeters per minute. The maximum peel adhesion value was recorded in Newtons per decimeter, as indicated above.

The results in Table 11 show that the non-tooled Peel Adhesion increases directly with % volume loading of K-20 glass bubbles, and when the % volume loading exceeds 50% the adhesive bond fails cohesively.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A reactive hot melt adhesive and/or sealing composition comprising a blend containing:
   (a) a first isocyanate-terminated prepolymer comprising the reaction product of an essentially semicrystalline hydroxy-functional material and a polyisocyanate;
   (b) a second isocyanate-terminated prepolymer comprising the reaction product of a polyether glycol and a polyisocyanate;
   (c) cellular objects, wherein said cellular objects are formed by a wall material consisting essentially of a material selected from the group consisting of an inorganic silicate and wherein said cellular objects comprise from about 40 to about 90 volume percent based on total volume of said composition; wherein said composition has a thermal conductivity value of less than 0.30 W/m°C., and a heat of crystallization of about −2 to about −18 joules per gram.

2. The composition of claim 1, wherein said essentially semicrystalline hydroxy-functional material has an essentially linear, saturated, aliphatic structure, a crystalline melting temperature between about 5° C. and 120° C. and a glass transition temperature less than about 0° C.

3. The composition of claim 1, wherein said polyether diol has a number average molecular weight (Mn) of from about 1,000 to about 5,000.

4. The composition of claim 1, wherein said essentially semicrystalline hydroxy-functional material comprises polyhexamethylene adipate; said polyether glycol comprises polyether diol; and said polyisocyanate comprises diphenylmethane diisocyanate.

5. The composition of claim 4, wherein said polyether diol and said polyhexamethylene adipate are contained in a weight ratio of 15:85 to 85:15, respectively, and said diphenylmethane diisocyanate is present in an excess of hydroxyl equivalents.

6. The composition of claim 1, wherein said wall material includes an alkali borate, said blend further comprising phosphoric acid in an amount effective to neutralize any alkali derivatives formed from said alkali borate.

7. The composition of claim 1, further comprising 4,4'-(oxydi-2,1-ethanediyl)bis-morpholine in an amount effective to increase the rate of isocyanate-termination of said first and second prepolymers or increase the rate of cure of said adhesive upon exposure to moisture.

8. The composition of claim 1, wherein said composition has a viscosity at 120° C. of between about 5,000 to about 300,000 centapoise.

9. The composition of claim 1, wherein said cellular objects comprise substantially spherical shapes.

10. The composition of claim 11, wherein said cellular objects have an average particle diameter in the range of about 5 to about 125 micrometers, and said wall material has a thickness of from about 0.5 to about 2 micrometers.

11. The composition of claim 1, wherein said cellular objects comprise from about 40 to about 80 volume percent based on total volume of said composition.

12. The composition of claim 1, wherein said cellular objects have an average particle diameter in the range of about 10 to about 100 micrometers, and said wall material has a thickness of from about 0.5 to about 2 micrometers.

13. The composition of claim 1, wherein said cellular objects comprise between about 10% to about 40% by weight based on total weight of said composition.

14. The composition of claim 1, wherein said cellular objects have a specific gravity of from about 0.1 to about 2.2.

15. The composition of claim 1, wherein said wall material is continuous.

16. The composition of claim 1, further comprising a toolability time of from 5 to 50 minutes before cure.

17. The composition of claim 1, further comprising an effective amount of a catalyst.

18. The composition of claim 1, wherein components (a), (b), and (c) are present in the weight proportions of: 6 to 37% (a), 27 to 80% (b), and 5 to 55% (c), with the proviso that the sum of (a)+(b)+(c) equals 100%, and the weight ratio of (b)/(a) is greater than 1.2.

19. The composition of claim 1, wherein said first isocyanate-terminated prepolymer and said second isocyanate-terminated prepolymer are curable upon exposure to water moisture or water vapor.

20. The composition of claim 1, wherein said cellular objects comprise soda-lime-borosilicate glass bubbles.

21. The composition of claim 1, wherein said composition has a heat of crystallization in joules per gram of −2 to −18.

22. The composition of claim 1, wherein said first isocyanate-terminated prepolymer comprises the reaction product of an essentially semicrystalline polyester polyol material and a polyisocyanate, and said a second isocyanate-terminated prepolymer comprises the reaction product of a polyoxyalkylene polyol and a polyisocyanate.

23. The composition of claim 22, wherein said essentially semicrystalline polyester polyol material is selected from the group consisting of polyhexamethylene adipate, polybutylene adipate, polyepsilon-caprolactone, and combinations thereof, and said polyoxyalkylene polyol comprises at least one of $C_2$ or $C_3$ alkylene.

* * * * *

UNITED STATES PATENT AND TRADEMARK OFFICE
CERTIFICATE OF CORRECTION

PATENT NO.: 5,525,663

DATED: June 11, 1996

INVENTOR(S): Hans T. Oien

It is certified that error appears in the above-identified patent and that said Letters Patent is hereby corrected as shown below:

Column 20, line 9, "claim 11" should read --claim 1--.

Signed and Sealed this

Nineteenth Day of October, 1999

Attest:

Attesting Officer

Q. TODD DICKINSON

Acting Commissioner of Patents and Trademarks